United States Patent
Watanabe et al.

[11] Patent Number: 5,110,689
[45] Date of Patent: * May 5, 1992

[54] MULTI-LAYERED STEEL SHEETS

[75] Inventors: Tsutomu Watanabe; Masaaki Yamashita; Takahiro Kubota, all of Tokyo; Yoshiaki Miyosawa; Tadashi Nishimoto, both of Amagasaki, all of Japan

[73] Assignees: NKK Corporation, Tokyo; Kansai Paint Co., Ltd., Amagasaki, both of Japan

[*] Notice: The portion of the term of this patent subsequent to Nov. 13, 2007 has been disclaimed.

[21] Appl. No.: 657,281

[22] Filed: Feb. 19, 1991

Related U.S. Application Data

[63] Continuation of Ser. No. 384,652, Jul. 25, 1989, abandoned.

Foreign Application Priority Data

Jul. 29, 1988 [JP] Japan .................. 63-190951

[51] Int. Cl.$^5$ .......................................... B32B 15/04
[52] U.S. Cl. .................................. 428/623; 428/626; 428/632; 428/659; 428/684
[58] Field of Search .......... 428/628, 626, 632, 659, 428/684

[56] References Cited

U.S. PATENT DOCUMENTS 4,970,126 11/1990 Adaniya et al. .................. 428/623
5,061,575 10/1991 Mohri et al. ..................... 428/626

Primary Examiner—George Wyszomerski
Attorney, Agent, or Firm—Nields & Lemack

[57] ABSTRACT

A first characteristic of the invention is present in forming a chromate film on the surface of a zinc or a zinc alloy plated steel sheet, and a resin composition film at a coating amount of 0.3 to 5.0 g/m$^2$ on said chromate fim, said resin composition film comprising an organic solvent soluble epoxy resin and hydrophobic silica in a ratio of 80:20 to 50:50 by weight of epoxy resin:hydrophobic resin, said epoxy resin having a glass transition temperature of 293° to 342° K.

A second characteristic of the invention is present in forming a chromate film on the surface of a zinc or zinc alloy plated steel sheet, and a resin composition film at a coating amount of 0.3 to 5.0 g/m$^2$ on said chromate film, and resin composition film comprising an organic solvent soluble epoxy resin having glass transition temperature of 293° to 342° K. and hydrophobic silica and sparingly water soluble Cr compound in a ratio of 80:20 to 50:50 by weight of epoxy resin:(hydrophobic silica+sparingly water soluble Cr compound), and in a ratio 37:3 to 20:20 by weight of hydrophobic silica:sparingly water soluble Cr compound.

23 Claims, 1 Drawing Sheet

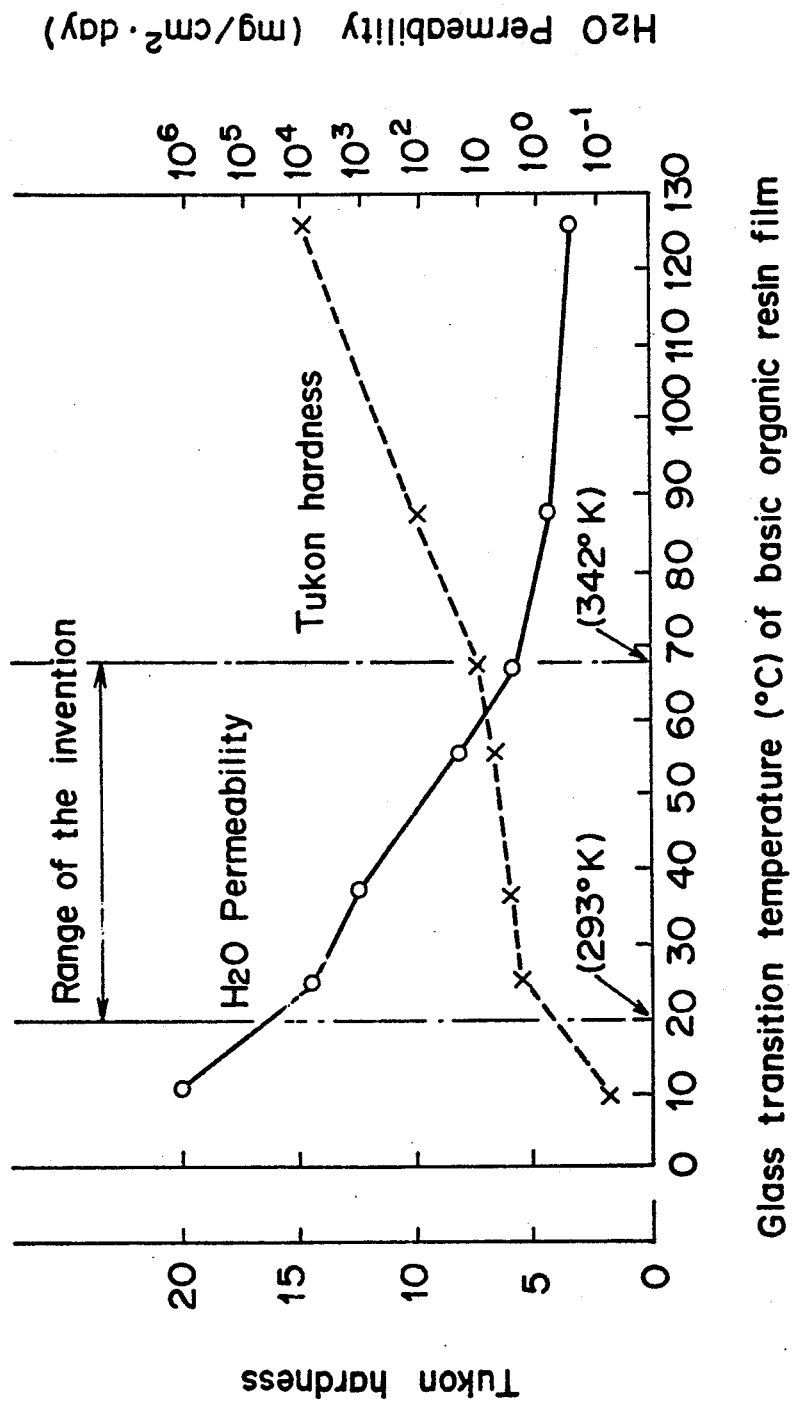

MULTI-LAYERED STEEL SHEETS

This is a continuation of ser. no. 07/384,652, filed Jul. 20, 1989, and now abandoned.

TECHNICAL FIELD

The present invention relates to multi-layered steel sheets having excellent paint adhesion and corrosion resistance suitable for domestic electrical appliances, building products and so on.

BACKGROUND OF THE INVENTION

In the prior art, outer plates of domestic electrical appliances were generally produced by forming, processing and setting up cold rolled steel sheets or zinc type plated steel sheets, followed by performing phosphate treatment and finally melamine, acrylic polyester type coating. Aiming at rust-proof properties, chromate treatment was widely made on the steel sheets, instead of phosphate treatment.

Since satisfactory corrosion resistance and paint adhesion could not be secured only with the phosphate and chromate treatments, steel sheet plated with double structured layers of an organic resin film (organic composite silicate film) on the chromate treatment was recently proposed in Japanese Patent Publication No.60-33192, and it has been reduced to practice as a coated substrate steel sheet, omitting the phosphate treatment.

Of this multi-layered steel sheet, the organic resin film of the upper layer is composed of a water dispersible silica sol and water soluble or water dispersible organic resin and silane compound.

However, for improving the corrosion resistance, the chromate film and the organic resin film of the multi-layers should be thick. Due to the thickness of the film, problems occur such as peeling of the film, deterioration of the paint adhesion and lowering of weldability under severe conditions. It is difficult to satisfy the requirements of (a) paint adhesion of high degree, (b) high corrosion resistance and weldability concurrently.

On the other hand, in the domestic electrical appliances, so-called fabricator precoated steel sheet, where the steel sheet is painted in advance and deformed by a roll-forming, has gradually become the trend of the times because of rationalization of the manufacturing process. A big problem with fabricator precoated steel sheet is to secure very severe paint adhesion durable to the roll forming and enough corrosion resistance.

For fabricator precoated steel sheet, not only the foregoing phosphate or chromate treatments but also the multi-layered steel sheet of Japanese Patent Publication No. 60-33192 lack sufficient paint adhesion and corrosion resistance, and there have been demands for paint adhesion excellent in forming process and corrosion resistance excellent after the forming process.

The present invention has been realized in view of problems involved about the prior art for providing multi-layered steel sheets having excellent paint adhesion, corrosion resistance and weldability, especially as plated substrate steel sheets for the fabricator precoated steel sheet.

DISCLOSURE OF THE INVENTION

For accomplishing the object, a chromate film is formed on a zinc or zinc alloy sheet, and a specific organic composite film is formed on the chromate film, thereby enabling to provide very excellent paint adhesion and corrosion resistance. That is, according to the invention, in the organic composite film, a base resin is a solvent type where a reduced amount of a functional group of hydrophilic nature is small and a water proof nature is well conditioned under a wet environment, and an epoxy resin is employed from a viewpoint of the paint adhesion and the corrosion resistance. Since a hydrophobic silica controls water absorption of the film under the wet environment and subsequently may obtain excellent corrosion resistance, hydrophobic silica is employed as additives, instead of hydrophibic silica as conventionally used silica sol. Further, by determining Tg point (glass transition temperature) of the solvent type epoxy resin being a base resin in a specific range, both of the very excellent paint adhesion and corrosion resistance could be satisfied at the same time. If the corrosion resistance is especially maintained and improved, the hydrophobic silica and sparingly water soluble Cr compound are used jointly, so that remarkable corrosion prevention could be provided.

A first characteristic of the invention is present in forma chromate film on the surface of a zinc or a zinc alloy plated steel sheet, and a resin composition film at a coating amount of 0.3 to 5.0 g/m$^2$ on said chromate film, said resin composition film comprising an organic solvent soluble opoxy resin and hydrophobic silica in a ration of 80:20 to 50:50 by weight of epoxy resin: said epoxy resin having a glass transition temperature of 293° to 342° K.

A second characteristic of the invention is present in forming a chromate film on the surface of a zinc or zinc alloy plated steel sheet, and a resin composition film at a coating about of 0.3 to 5.0 g/m$^2$ on said chromate film, said resin composition film comprising an organic solvent soluble epoxy resin having glass transition temperature of 293° to 342° K and hydrophobic silica and sparingly water soluble CR compound in a ratio of 80:20 to 50:50 by weight of epoxy resin:(hydrophobic silica+sparingly water soluble CR compound), and in a ratio of 37:3 to 20:20 by weight of hydrophobic silica:-sparingly water soluble Cr compound.

BRIEF DESCRIPTION OF THE DRAWING

FIG. 1 shows influences of glass transition temperatures of a basic organic resin film to Tukon hardness and H$_2$O permeability.

DETAILED DESCRIPTION OF THE INVENTION

The present invention will be explained in detail.

The invention uses, as a starting material, a steel sheet plated with zinc or a zinc alloy, and includes, on its surface, a chromate film which further includes thereon a resin film containing given additives.

The zinc or zinc alloy-plated sheet to be used as the starting material may include steel sheets which are galvanized or plated with zinc-iron alloys, zinc-nickel alloys, zinc-manganese alloys, zinc-aluminium alloys and zinc-cobalt-chromium alloys. These plating components may contain one or more of elements such as Ni, Fe, Mn, Mo, Co, Al and Cr. Use may also be made of compositely plated steel sheets having two or more deposits of the identical or different types. For instance, a film consisting of two or more layers of Fe-Zn alloys having different Fe contents may be deposited onto a steel sheet.

Of course, reference is given to the steel sheets plated with zinc-nickel and -manganese alloys in view of corrosion is preferred that the nickel content of the deposited film ranges from 5 to 20 weight % for the steel sheets plated with zinc-nickel alloys, and the manganese content of the deposited film ranges from 30 to 85 weight % for the steel sheets with zinc-manganese alloys.

The steel sheets may be plated with zinc or zinc alloys by any one of the electrolytic, hot dip, gas-phase and like process, provided that they are feasible.

A chromate film is formed on the surface of the starting plated steel sheet by treating it with chromic acid.

In the chromate film, the amount—on the dry basis—of chromium deposited is suitably in the order of 10 to 200 mg/m$^2$, preferably 30 to 80 mg/m$^2$ (calculated as metallic chromium). When the amount of chromium deposited exceeds 200 mg/m$^2$, workability and weldablity tend to deteriorate. When the amount of chromium deposited is below 10 mg/m$^2$, on the other hand, it is likely that the obtained film may become uneven, resulting in deterioration of its corrosion resistance. It is preferable that sexivalent Cr is present in the chromate film. The sexivalent Cr produces a repairing action, and serves to inhibit the occurrence of corrosion from flaws in the steel sheet, if it flaws.

The chromate treatment for obtaining such an undercoat may be carried out by any one of the known reaction, coating and electrolytic type processes.

The coating type chromate treatment liquid is composed mainly of a solution of partly reduced chromic acid and, if required, may contain an organic resin such as a water-dispersible or -soluble acrylic resin and/or silica (colloidal silica, fused silica) having a particle size of several m to several hundreds m. It is then preferable that the ratio of $Cr^{3+}$ to $Cr^{3+}$ is 1/1 to $\frac{1}{3}$, and pH is 1.5 to 4.0, preferably 2 to 3. The ratio of $Cr^{3+}$ to $Cr^{6+}$ is adjusted to the predetermined value by using general organic reducing agent (e.g., saccharides, alcohols, etc.) or inorganic reducing agents. The coating type chromate treatment may rely upon any one of the roll coating, immersion and spray processes. In the coating chromate treatment the films are obtained by the chromate treatment, followed by drying without water washing. The reason for carrying out drying wihtout water washing is that usually applied to water washing causes removal of $Cr^{6+}$. By conducting drying without water washing in this manner, it is possible to keep the ratio of $Cr^{3+}$ $Cr^{6+}$ constant in a stable state, and inhibit excessive elusion of $Cr^{6+}$ in corrosive environments by the basic epoxy resin film formed on the chromate film, hence effectively maintain the passivating action of $Cr^{6+}$ over an extended period of time, thereby to achieve high corrosion-resistant ability.

In the electrolytic type chromate treatment, on the other hand, cathodic electrolysis is carried out in a bath containing chromic anhydride and one or two or more of anions of sulfuric acid, fluoride phosphate, halogen exyacids and so on, and water washing and drying are then conducted to obtain the films. From the comparison of the chromate films obtained by the aforesaid two treatment processes, it is found that the coating type chromate film is superior in corrosion resistance to the electrolytic type chromate film due to its increased content of $Cr^{6+}$. In addition, when heat-treated as will be described later, the former is improved in corrosion resistance over the latter due to its further densification and intensification. However, the electrolytic type chromate film is advantageous, partly because its integrity is increased regardless of whether or not the heat treatment is applied, and partly because it is easy to control the amount of the film deposited. With corrosion resistance in mind, the most preference is given to the coating type chromate film.

The chromate film is formed thereon with a resin-composition film obtained by adding inorganic compound to an epoxy resin that is a basic resin. This resin composition film is formed by coating the resin composition on the chromate film, and carrying out determined drying-baking treatments.

The organic polymer which is the basic resin of this resin composition film should have a glass transition temperature in a range of 293° to 342° K.

If the glass transition temperature is less than 293° K, a cross-linking is insufficient, and an anti-permeability of corrosive components (corrosion accelerating substances such as $H_2O$, cation and so on) of the organic film is insufficient, so that the corrosion reaction is easily caused, and the corrosion resistance is deteriorated. On the other hand, if the glass transition temperature exceeds 342° K, an internal stress in the coated film is high, and since flexibility is inferior, the organic polymer would be unsuitable to cases requiring very severe adhesion or deformability the present invention aims at.

As the epoxy resins, use may be made of straight epoxy resins of the epichlorohydrin, glycidyl ether and other types, fatty acid-modified epoxy resins, polybasic acid-modified epoxy resins, acrylic resin-modified epoxy resins, alkyd (or polyester)-modified resins, polybutadiene-modified resins, phenol-modified resins, amine or polyamine-modified epoxy resins, urethane-modified epoxy resins and so on. Further, arbitrary curing agents may be used, for example, melamine resin or isocyanate compound may be used.

In accordance with &he present invention, hydrophobic silica is incorporated into the resin-composition film as the additive, thereby obtaining high corrosion-proofness.

Although the mechanism of improvement in corrosion-proofness by incorporation of such silica is not yet clarified, it is presumed that the silica reacts with $Zn^{2+}$ eluted in corrosive environments to form stable corrosion products to inhibit pitt corrosion, thereby producing an effect upon improvements in corrosion resistance over a prolonged period of time.

In general, silica is classified into hydrophibic silica and hydrophobic silica called as colloidal silica and fused silica, which both have an excellent corrosion-proof effect. Particularly, the hydrophobic silica is effective in improving corrosion resistance. For example, Japanese Patent Publication No.60-33192 as mentioned above, teaches that hydrophibic colloidal silica is added to organic resins. Due to its strong hydrophobic nature, however, the hydrophibic silica is less compatible with solvents and tends to incur the permeation of water. Presumably, this is responsible for a reduction in corrosion resistance, and easily causes incipient rust in wet environments in particular. The reason why the hydrophobic silica produces an excellent corrosion proof effect is, on the contrary, considered to be that it shows satisfactory compatibility with resins during the formation of films, resulting in the formed film being uniform and firm.

In the steel sheets of the invention, the hydrophobic silica is thus incorporated into the epoxy resin to enhance the compatibility therewith and obtain high corrosion resistance.

The hydrophobic silica is incorporated into the epoxy resin in a weight ratio of 80:20 to 50:50, preferably 70:30 to 55:45.

If the ratio of epoxy resin to silica is below 80:20, the incoporation of the hydrophobic silica could not be expected to produce any effect upon improvements in corrosion resistance. In a ratio of higher than 50:50, on the other hand, the adhesion of paint drops. The hydrophobic silica should preferably have a particle size of suitably 1 m$\mu$ to 500 m$\mu$, particularly 5 m$\mu$ to 100 m$\mu$.

The hydrophibic silica known as colloidal silica (silica gel) or fumed silica is covered on the surface with a hydroxyl group (a silanol group→Si-OH), and shows hydrophilic nature. The hydrophobic silica is formed by substituting partly or almost wholly the hydrogen (H) of silanol groups of such water dispersible silica with methyl or like alkyl groups, thereby making the surface thereof hydrophobic.

The hydrophobic silica may be prepared by various methods. According to one typical method, the water dispersible silica is permitted to react with silanes, silazanes, polysiloxanes or organic solvents such as alcohols, keton and esters. The reactions may take place under pressure or with the application to catalysts and heat.

As such hydrophobic silica, reference may be made to, e.g., (1) colloidal silica dispersed in organic solvents such as methyl alcohol, ethyl alcohol, n-propyl alcohol, isopropyl alcohol, n-butyl alcohol, ethyl cellosolve and ethylene glycol (for instance OSCAL 1132, 1232, 1332, 1432, 1532, 1622, 1722, 1724 manufactured by Shokubai Kasei Kagaku Kogyo K.K. and others), and (2) silica having its surface made hydrophobic by an organic solvent, a reactive silane compound and the like, viz., hydrophobic ultra fine silica (for instance, R974, R811, R812, R805, T805, R202, RY 200, RX200 manufactured by Nippon Aerosil Co., Ltd. and others).

Such hydrophobic silica as mentioned above is stably dispers ed in the epoxy resin.

According to the invention, in adition to the aforesaid hydrophobic silica, it is possible to incorporate a sparingly water soluble Cr compound into the resin-composition film, thereby further improving corrosion resistance. Under the corrosive environments, a slight amount of $Cr^{6+}$ is eluted out of the sparingly water soluble Cr compound in the film, and produce a passivating effect over an extended period of time to improve its corrosion resistance.

The sparingly water soluble Cr compound should be incorporated in a proportion of 1 to 30 weight parts, preferably 5 to 20 weight parts with respect to 100 weight parts of the basic resin (organic high-molecular resin). When the amount of the sparingly water soluble Cr compound incorporated is less than 1 weight part per 100 weight parts of the basic resin, any effect upon improvements in corroison resistance could not be expected. When that amount exceeds 30 weight parts, on the other hand, the adhesion of paint drops due to the water absorption of the sparingly water soluble Cr compound.

It is noted that the corrosion proof effect is increased to the highest level by the composite addition of the hydrophobic silica and sparingly water soluble Cr compound in the predetermined proportion.

As mentioned above, when $Zn^{2+}$ etc. are eluted out of the undercoat, it is presumed that the hydrophobic silica reacts therewith to form stable corrosion products over the entire surface of the specimen, which serves to produce a corrosion-proof effect. On the other hand, the sparingly water solubel Cr compound releases a slight amount of $Cr^{6+}$, which is then passivated to produce a corrosion-proof effect. This effect is parti cularly remarkable in corrosive environments such as SST (Salt Spray Test) where continuous dissolution of the sparingly water soluble Cr compound occurs.

If contained as the rust preventive in the resin film, the sparingly water soluble Cr compound could not be expected to produce any appreciable corrosion-proof effect in accelerated corrosion tests wherein wet and dry conditions appear alternately as is the case with CCT (Continuous Corrosion Test) simulating an actual corrosive environment. In test, to use hydrophobic silica as the rust preventive is rather more effective. When the accelerated tests are carried out with specimens subjected to strong working or extremely sharp cutting, however, no sufficient repair ing effect is produced on injured portions by incorporating only the silica into the resin as the rust preventive.

The inventors have found that if the silica and sparingly water soluble Cr compound different from each other in the corrosion-resistant mechanism are contained in the resin in some specific proportions, it is then possible to achieve improved corrosion resistance through their synergistic effects upon corrosion-proofness.

More specifically, the optimum region of each component is as follows.

1. Weight ratio of basic resin : (hydrophobic silica +sparingly water soluble Cr compound)→80:20 to 50:50, preferably 70:30 to 55:45
2. Weight ratio of hydrophobic silica:sparingly water soluble Cr compound→37:3 to 20:20

If the composing amounts of the hydrophobic silica and the sparingly water soluble Cr compound are less than 80:20 as expressed in terms of the weight ratio of the epoxy resin (hydrophobic silica +sparingly water soluble Cr compound), no sufficient corrosion resistance is obtained. At 70:30 or higher, it is possible to obtain films having the best corrosion resistance. On the other hand, if the amounts of the aforesaid additives exceeds 50:50, a problem arises in connection with corrosion resistance. At 50:50 or lower, improved corrosion resistance is achieved. Therefore, the optimum weight ratio of the substrate resin : (hydrophobic silica +sparingly water soluble Cr compound) is between 80:20 and 50:50, preferably 70:30 and 55:45.

If the weight ratio of the hydrophobic silica to sparingly water soluble Cr compound dispersed in the resin is less than 37:3, the problem that corrosion resistacne is insufficient arises due to an insufficient repairing effect of $Cr^{6+}$.

If the amount of the hydrophobic silica is less than 20:20 in terms of the aforesaid weight ratio, on the other hand, the formation of stable corrosion products of the silica and $Zn^{2+}$ is too unsatisfactory to obtain satisfactory corrosion resistance. Therefore, the optimum weight ratio of the hydrophobic silica to sparingly water soluble Cr compound to be contained in the resin is between 37:3 to 20:20.

As the sparingly water soluble Cr compound, use may be made of barium chromate ($BaCrO_4$), strontium chromate ($SrCrO_4$), lead chromate ($PbCrO_4$), zinc chromate ($ZnCrO_4.4Zn(OH)_2$), calcium chromate ($CaCrO_4$), potassium chromate ($K_2O.4ZnO.4CrO_3.3H_2O$) and silver chromate ($AgCrO_4$). One or two or more of these compounds is or are dispersed in the basic resin.

Other chromium compounds are unsuitable for the purpose of the invention, since they are less compatible with the basic resin, or are poor in double-coating adhesion, though showing a corrosion-proof effect, because they contain much soluble $Cr^{6+}$.

However, it is preferred to use $BaCrO_4$ and $SrCrO_4$, in view of the corrosion resistance of steel sheets, if they are subjected to strong working (e.g., draw-bead tests), or are provided with sharp cuts (of about 1 mm in width).

When the surface-treated steel sheets according to the invention are actually used by the users, they may be often coated. When coating is carried out by automoive makers, pre-treatments such as degreasing may be carried out, as occasion arises. The surface-treated steel sheets obtained according to the invention release Cr, although in slight amounts, at the pre-treatment steps for coating, since the chromate undercoat and the resin film contain soluble $Cr^{6+}$. When discharging waste water produced at such pre-treatment steps in surroundings, makers of the house electrical appliances should be disposed that of waste water, since its Cr concentration is regulated by an environmental standard. Due to certain limitations imposed upon the ability of waste water disposal plants, however, it is preferred that the amount of elution of Cr is reduced. Of the sparingly water soluble Cr compound incorporated into the substrate resin, $BaCrO_4$, releases Cr at the pre-treatment steps in an amount smaller than do other chromium compounds. In view of the elusion of Cr, therefore, it is preferred to use $BaCrO_4$.

According to the present invention, a di- or tri-alkoxy silane compound is further added to the compositions comprising the aforesaid basic resin, the hydrophobic silica and the sparing ly water soluble Cr compound to promote the crosslinking reaction As the silane compounds capable of producing such an action and effect, reference may be made to, e.g., divinyldimethoxysilane, divinyl- $\beta$-methoxyethoxysilane, vinyltriethoxysilane, vinyl-tris ($\beta$-methoxyethoxy) silane, $\gamma$-glycidoxypropyl-trimethoxysilane, $\gamma$-methacryloxypropyltrimethoxysilane, $\beta$-(3,4-epoxycyclohexyl) ethyltrimethoxysilane, N-p(aminoethyl) $\gamma$-aminopropyltriethoxysilane, and -aminopropyltriethoxysilane.

The proportion of the silane compound added is in a range of 0.5 to 15 weight parts, preferably 1 to 10 weight parts with respect to 100 weight parts of the total weight of the solid matters of the epoxy resin, hydrophobic silica and sparingly water soluble Cr components. The addition of the silane compound produces no noticeable crosslinking effect in an amount of less than 0.5 weight parts. When the silane compound is added in an amount exceeding 15 weight parts, on the other hand, any effect corresponding to that amount cannot be expected.

According to the invention, other additives known in the art (e.g. surfactant), rust-preventing pigments such as, for instance chrome or nonchrome base pigments, extender pigments, coloring pigments and so on may be used in addition to the aforesaid silica, sparingly water soluble Cr compound and silane compound components.

As mentioned above, the resin-composition film is formed on the chromate film in a coating weight of 0.3 to 5.0 $g/m^2$, preferably 0.5 to 3.0 $g/m^2$. No sufficient corro obtained in a coating weight of less than 0.3 $g/m^2$, whereas workability drops in a coating weight exceeding 5.0 $g/m^2$. The paint adhesion is more or less inferior, and weldability (especially, continuous multi-point weldability) in a coating weight exceeding 3.0 $g/m^2$.

The steel sheets according to the invention may be applied to various kinds of uses as the home electrical appliances, building materials, automobile parts, and may be used to other than the own prepared precoats.

EXAMPLES

EXAMPLE 1

With respect to the inventive materials and the comparative materials under the different plating and film conditions as shown in Tabel 1-a to Table 1-f, epoxy group primer for PCM was coated ("KP Color 8470 Primer" of 4 $\mu$ thickness, manufactured by Kansai Paint Co., Ltd.: 210° C. (temperature of sheet)×50 sec.-baking, and further a polyester group finish coat was made ("KP Color 1470 Blue" of 15 $\mu$ thickness by Kansai Paint Co., Ltd.: 220° C. (temperature of sheet)×50 sec.-baking, and the paint adhesion and the corrosion resistance were appreciated after such 2 coats paintaing.

After plating, each steel sheet was degreased with an alkali, followed by water washing and drying. The sheet was coated with the coating type chromate treatment liquid by means of a roll coater, or was immersed in an electrolytic chromate treatment bath, thereby forming an electrolytic film. After drying, the resin liquid was coated on that film as the second film. After drying, the product was heat-treated and air-cooled. The conditions for the coating type and electrolytic chromate treatments are as follows.

CONDITIONS FOR COATING TYPE CHROMATE TREATMENT

A chromate treatment liquid of $Cr^{3+}/Cr^{6+}=2/3$ and pH=2.5 was coated on each plated steel sheet at normal temperature by means of a roll coater, followed by drying.

CONDITIONS FOR ELECTROLYTIC CHROMATE TREATMENT

Cathodic electrolysis was carried out in a bath containing 50 g/l of $CrO_3$ and 0.5 gl of $H_2SO_4$ at a bath temperature of 50° C. and a current density of 4.9 $A/dm^2$ for an electrolysis time of 2.0 sec., followed by water washing and drying.

Table 2 to Table 5 show the substrate sheets, the basic resins, silica and Cr compounds used in the present examples.

As the basic resin, a to i shown in Table 3 were employed, and those were composed of following resins I to VII.

COMPOSITIONS OF RESINS I TO V

Following the mixing conditions shown in following Table, Epicoat #1001 or Epicoat #1007 (by Shell Kagaku K.K.) and linseed fatty acid were charged into the reaction oven having a thermometer, stirrer, condenser and dropping funnel, and agitated and heated in a nitrogen stream. This substance was dissolved uniformly at the temperature of 100° C., and added with benzonic acid soda, di-n-butyl tin oxide and toluole, and heated up to the temperature of 210° C., taking about 1 hour, and continued the reaction at the temperature of 210° C. for about 3 hours until an acid number became below 5. Subsequently, the cooling was started, and when it was 150° C., the reaction was finished with but cellosolve.

Compositions of Resins I to V

| Raw Materials | Resin I | Resin II | Resin III | Resin IV | Resin V | Remarks |
| --- | --- | --- | --- | --- | --- | --- |
| Epicoat #1001 (*1) (Parts) | 950 | 950 | 0 | 0 | 0 | — |
| Epicoat #1007 (*1) (Parts) | 0 | 0 | 2500 | 2500 | 2500 | — |
| Linseed Fatty Acid (*2) (Parts) | 720 | 360 | 720 | 360 | 180 | — |
| Toluol (*3) (Parts) | 84 | 66 | 160 | 140 | 130 | Reflux Solvent |
| Benzonic Acid Soda (*4) (Parts) | 1 | 1 | 2.5 | 2.5 | 2.5 | Reaction Solvent |
| Di-n-butyl tin Oxide (*5) (Parts) | 3.3 | 2.6 | 6.4 | 5.7 | 5.4 | Reaction Solvent |
| Butylcelosolve (Parts) | 1581.7 | 1240.4 | 3051.1 | 2711.8 | 2542.1 | Dilute Solvent |
| Total (Solid parts 50%) | 3340.0 | 2620.0 | 6440.0 | 5720.0 | 5360.0 | — |

Note
(*1) Epicoat #1001 Molecular Weight: 950
Epicoat #1007 Molecular Weight: 2500
(*2) Linseed Taffy Acid Molecular Weight: 280
(*3) Toluol Amount: 5% of total of epoxy (Epicoat #1001 or #1007) and linseed fatty acid
(*4) Benzonic Acid Soda: 0.1% of epoxy (Epicoat #1001 or Epicoat #1007)
(*5) Di-n-butyl tin oxide: 0.2% of total of epoxy (Epicoat #1001 or #1007) and linseed fatty acid RSIN VI (Polyester Resin)

Kp color #1502 Clear (by Kansai Paint Co., Ltd.)

COMPOSING EXAMPLES OF RESIN VII (Acryl Resin)

50 parts of xylene and 17 parts of butyl acetate were charged into a four necked flask of 300 ml having a thermometer, stirrer, condenser and dropping funnel. The air in the flask was replaced with nitrogen, and the content therein was maintained at the temperature of not more than 80° C. Mixed monomer composed of 2.0 parts of azoisobutyronitrile, 33 parts of methyl methacrylate 20 parts of styrene, 1 part of acrylic acid, 34 parts of acrylic acid ethyl and 12 part of acrylic acid n-butyl was adopted in the dropping funnel. The content in the flask was maintained 112° C. and dropped, taking 3 hours. After having dropped, this temperature was maintained for 1 hour, and 0.5 parts of azoisobutylva ronitrile and 10 parts of butyl acetate were dropped, and the reaction was carried out at the temperature of 112° C. for 3 hours. After the reaction, the substance was cooled to 80° C. and controll ed with xylol to the solid parts of 60%, and such acryl resin was obtained where the rate of polymerization: 100%, molecular amount by GPC:2000, viscosity Z1 (Gardner viscometer/25° C.) in about 60% of the solid part and galss transition temperature: about 60° C.

The properties after the 2 coats were as follows.

SCRATCHING RESISTANCE

A coin without indentations was held by a hand at 45° with respect to the coated surface and scratched by crossing in the length of 50 mm for checking the outer coated face.

Appreciation Point 5: Only scratches of the coated surface, and no exposure of the substrate.
Appreciation Point 3: Exposed substrate was found in parts of the cross.
Appreciation Point 1: The substrate was exposed clearly.

ADHESION OF BENDING TEST

The steel sheet of a test piece was coated with a paint in 50 mm width, and was bent 180° around a bar of 2 mm diameter (i.e., U-turn of 180° ) with the coated side being outside. A sheet of the same thickness as said test piece was kept between the bent sheets, and pressed there by a vise. On the U-turned bent and coated parts, a cellophane tape was attached by the fingers, and the cellophane tape was rapidly stripped, and the stripped degree was measured. The bent parts were shown as under in accordance with the number of the sheets kept therebetween.

0T: No sheet was held between 180° bendings
1T: One sheet was held between 180° bendings
2T: Two sheets were held between 180° bendings
Appreciation Point 5: No stripping of the film was found
Appreciation Point 4: Full length of stripping was 3±1 mm
Appreciation Point 3: Full length of stripping was 8±2 mm
Appreciation Point 2: Full length of stripping was 17±3 mm
Appreciation Point 1: Full length of stripping was 30±4 mm

SHOCK ADHESION PROPERTIES

The drop-shock testing machine of Dupon system was used. A weight of 1 Kg was dropped at the height of 50 cm. The shocked was pressed with the cellophane tape by the fingers, and rapidly stripped, and the stripped degree was observed.

Appreciation Point 5: No abnormal
Appreciation Point 4: Slight cracks in the coating
Appreciation Point 3: Cracks, but no peeling
Appreciation Point 2: Cracks, and peelngs were found partly.
Appreciation Point 1: All of the cracked parts were peeled.

WET RESISTANCE

Following JIS-Z-0228, the coated sheets were positioned in the wet testing box of 50° C. and 100% RH for 2000 hours, and observed for the conditions of the coating.

CORROSION RESISTANCE

A cyclic test with one cycle of salt spray test 8h by JIS-Z-2371—Drying 60° C.×2h was carried out for 15 cuts were made with a knife till reaching the substrate before performing the corrosion resistance test, and after the test those parts were appreciated with the peeling width (mm) of the coated film of one side.

In the examples shown in Table 1-a to Table 1-f, the additives of No.1 to No.62 were silica-Cr groups, and those of to No.83 were silica groups. Influences thereof were investigated by the respective examples.

No.1 to No.9: Influences of sorts of the basic resins were studied.
No.10 to No.14: Influences of sorts of the substrate and chromates were studied.
No.15 to No.25: Influences of sorts of silica and Cr compounds were studied.
No.26 to No.32: Influences of coating amounts of chromate films were studied.
No.33 to No.41: Influences of coating amounts of the resin films.
No.42 to No.50: Influences of silica/Cr compoun were studied when basic resin/(silica+Cr compound)=60/40.
No.51 to No.62: Influences of the basic resin/(silica+Cr compound) when silica/Cr compound=30/10.
No.63 to No.67: Influences of basic resins/silica were studied.
No.68 to No.75: Influences of sorts of the basic resins were studied.
No.76 to No.79: Influence of sorts of silica were studied.
No.80 to No.83: Comparative examples using organic composite silicates (Patent Publication 60-33192)

In those examples, the excellent characteristics were obtained in following ranges.

1) Glass transition temperature of epoxy resin as basic resin: 293 to 342° K, preferably 303 to 332° K
2) Basic resin/silica = 80/20 to 50/50, preferably 70/30 to 55/45
3) Basic resin/(silica + Cr compound) = 80/20 to 50/50, and silica/Cr compound = 37/3 to 20/20
4) Coating amount of chromate film = 10 to 200 g/m$^2$, preferably 30 to 80 mg/m$^2$
5) Coating amount of resin film: 0.3 to 5.0 g/m$^2$ The same tests after the coatings were appreciated with 1 coat amino alkid coating 20 ("AMILAC" 120° C.×20 min.-baking Kansai Paint Co., Ltd.), and the same results were obtained.

TABLE 1-a

| No. | F*1 | G H | I | J*2 | K L*3 | M*4 | N | O | P | Q | R | S 0T | 1T | 2T | T | U | V | Remarks |
|---|---|---|---|---|---|---|---|---|---|---|---|---|---|---|---|---|---|---|
| 1 | Inv. E | A | C.T | 50 | b | 3 | 1 | 60/40 | 30/10 | 1.5 | 150 | 5 | 5 | 5 | 5 | 5 | 0.8 | W |
| 2 | " | " | " | " | " | c | " | " | " | " | " | " | 5 | 5 | 5 | 5 | 5 | 0.2 | " |
| 3 | " | " | " | " | " | d | " | " | " | " | " | 160 | 5 | 5 | 5 | 5 | 5 | 0.1 | " |
| 4 | " | " | " | " | " | e | " | " | " | " | " | " | 4 | 4 | 5 | 5 | 4 | 0.3 | " |
| 5 | Com. E | " | " | " | " | a | " | " | " | " | " | 150 | 5 | 5 | 5 | 5 | 5 | 3-5 | X |
| 6 | " | " | " | " | " | f | " | " | " | " | " | 180 | 2 | 2 | 2 | 3 | 3 | 0.2 | W |
| 7 | " | " | " | " | " | g | " | " | " | " | " | " | 1 | 1 | 1 | 3 | 2 | 0.2 | " |
| 8 | " | " | " | " | " | h | " | " | " | " | " | 200 | 3 | 2 | 3 | 3 | 3 | 2-3 | " |
| 9 | " | " | " | " | " | i | " | " | " | " | " | 100 | 2 | 1 | 2 | 3 | 2 | 3-4 | " |
| 10 | Inv. E | " | E.T | " | c | " | " | " | " | " | " | 150 | 5 | 5 | 5 | 5 | 5 | 0.8 | " |
| 11 | " | B | C.T | " | " | " | " | " | " | " | " | " | 5 | 5 | 5 | 5 | 5 | 0.1 | " |
| 12 | " | C | " | " | " | " | " | " | " | " | " | " | 4 | 4 | 4 | 5 | 4 | 0.8 | " |
| 13 | " | D | " | " | " | " | " | " | " | " | " | " | 5 | 4 | 4 | 5 | 4 | 0.1 | " |
| 14 | Com. E | E | " | " | " | " | " | " | " | " | " | " | 3 | 2 | 3 | 4 | 3 | 10 | X |
| 15 | Inv. E | A | " | " | " | 1 | " | " | " | " | " | " | 5 | 5 | 5 | 5 | 5 | 0.2 | W |

TABLE 1-b

| No. | F*1 | G H | I | J*2 | K L*3 | M*4 | N | O | P | Q | R | S 0T | 1T | 2T | T | U | V | Remarks |
|---|---|---|---|---|---|---|---|---|---|---|---|---|---|---|---|---|---|---|
| 16 | Inv. E | A | C.T | 50 | c | 2 | 1 | 60/40 | 30/10 | 1.5 | 150 | 5 | 5 | 5 | 5 | 5 | 0.3 | W |
| 17 | " | " | " | " | " | 4 | " | " | " | " | " | " | 5 | 5 | 5 | 5 | 5 | 0.2 | " |
| 18 | " | " | " | " | " | 3 | 2 | " | " | " | " | " | 5 | 5 | 5 | 5 | 5 | 0.2 | " |
| 19 | " | " | " | " | " | " | 3 | " | " | " | " | " | 5 | 5 | 5 | 5 | 5 | 0.5 | " |
| 20 | " | " | " | " | " | " | 4 | " | " | " | " | " | 5 | 5 | 5 | 5 | 5 | 0.2 | " |
| 21 | " | " | " | " | " | " | 5 | " | " | " | " | " | 5 | 5 | 5 | 5 | 5 | 0.6 | " |
| 22 | " | " | " | " | " | " | 6 | " | " | " | " | " | 5 | 5 | 5 | 5 | 5 | 0.4 | " |
| 23 | Com. E | A | " | " | " | 5 | 1 | " | " | " | " | " | 5 | 5 | 5 | 5 | 5 | 2-3 | Y |
| 24 | " | " | " | " | " | 3 | 7 | " | " | " | " | " | 5 | 5 | 5 | 5 | 5 | 4-5 | X |
| 25 | " | " | " | " | " | 5 | 7 | " | " | " | " | " | 5 | 5 | 5 | 5 | 5 | 4-5 | " |
| 26 | Inv. E | " | " | 10 | " | 3 | 1 | " | " | " | " | " | 5 | 5 | 5 | 5 | 5 | 1.5 | W |
| 27 | " | " | " | 30 | " | " | " | " | " | " | " | " | 5 | 5 | 5 | 5 | 5 | 0.2 | " |
| 28 | " | " | " | 80 | " | " | " | " | " | " | " | " | 5 | 5 | 5 | 5 | 5 | 0.1 | " |
| 29 | " | " | " | 200 | " | " | " | " | " | " | " | " | 4 | 4 | 4 | 4 | 4 | 0.1 | " |
| 30 | Com. E | A | — | — | " | " | " | " | " | " | " | " | 3 | 2 | 2 | 3 | 3 | 10 | X |

TABLE 1-c

| No. | F*1 | G H | I | J*2 | K L*3 | M*4 | Resin Films N | O | P | Q | R | S 0T | 1T | 2T | T | U | V | Remarks |
|---|---|---|---|---|---|---|---|---|---|---|---|---|---|---|---|---|---|---|
| 31 | Com. E | A C.T | 55 | c | 3 | 1 | 60/40 | 30/10 | 1.5 | 150 | 4 | 4 | 4 | 4 | 3 | 3-4 | W | |
| 32 | " | " " | 300 | " | " | " | " | " | " | " | 2 | 2 | 3 | 3 | 2 | 0.1 | " | |
| 33 | Inv. E | " " | 50 | " | " | " | " | " | 0.3 | " | 5 | 5 | 5 | 5 | 5 | 1.0 | " | |
| 34 | " | " " | " | " | " | " | " | " | 0.5 | " | 5 | 5 | 5 | 5 | 5 | 0.7 | " | |
| 35 | " | " " | " | " | " | " | " | " | 1.0 | " | 5 | 5 | 5 | 5 | 5 | 0.3 | " | |
| 36 | " | " " | " | " | " | " | " | " | 2.0 | " | 5 | 5 | 5 | 5 | 5 | 0.1 | " | |
| 37 | " | " " | " | " | " | " | " | " | 3.0 | " | 5 | 5 | 5 | 5 | 5 | 0.1 | " | |
| 38 | " | " " | " | " | " | " | " | " | 5.0 | " | 4 | 4 | 4 | 5 | 4 | 0.1 | " | Z |
| 39 | Com. E | " " | " | " | — | — | — | — | — | " | 4 | 4 | 4 | 4 | 4 | 3-4 | " | |
| 40 | " | " " | " | " | c | 3 | 1 | 60/40 | 30/10 | 0.1 | " | 4 | 4 | 4 | 5 | 4 | 2-3 | " | |
| 41 | " | " " | " | " | " | " | " | " | " | 8.0 | " | 3 | 2 | 3 | 4 | 3 | 0.1 | " | Z |
| 42 | Inv. E | " " | " | " | " | " | " | " | 35/5 | 1.5 | " | 5 | 5 | 5 | 5 | 5 | 0.2 | " | |
| 43 | " | " " | " | " | " | " | 4 | " | " | " | " | 5 | 5 | 5 | 5 | 5 | 0.2 | " | |
| 44 | " | " " | " | " | " | " | " | " | 30/10 | " | " | 5 | 5 | 5 | 5 | 5 | 0.2 | " | |
| 45 | " | " " | " | " | " | " | 1 | " | 20/20 | " | " | 5 | 5 | 5 | 5 | 5 | 0.2 | W | |

TABLE 1-d

| No. | F*1 | G H | I | J*2 | K L*3 | M*4 | Resin Films N | O | P | Q | R | S 0T | 1T | 2T | T | U | V | Remarks |
|---|---|---|---|---|---|---|---|---|---|---|---|---|---|---|---|---|---|---|
| 46 | Inv. E | A C.T | 50 | c | 3 | 4 | 60/40 | 20/20 | 1.5 | 150 | 5 | 5 | 5 | 5 | 5 | 0.2 | W | |
| 47 | Com. E | " " | " | " | " | 1 | " | 10/30 | " | " | 5 | 5 | 5 | 5 | 5 | 1.5 | " | |
| 48 | " | " " | " | " | " | 4 | " | " | " | " | 5 | 5 | 5 | 5 | 5 | 2.0 | " | |
| 49 | " | " " | " | " | — | 1 | " | 0/40 | " | " | 5 | 5 | 5 | 5 | 5 | 2.3 | " | |
| 50 | " | " " | " | " | — | 4 | " | " | " | " | 5 | 5 | 5 | 5 | 5 | 2.3 | " | |
| 51 | Inv. E | " " | " | " | 3 | 1 | 75/25 | 30/10 | " | " | 5 | 5 | 5 | 5 | 5 | 1.0 | " | |
| 52 | " | " " | " | " | " | 4 | " | " | " | " | 5 | 5 | 5 | 5 | 5 | 1.0 | " | |
| 53 | " | " " | " | " | " | " | 60/40 | " | " | " | 5 | 5 | 5 | 5 | 5 | 0.2 | " | |
| 54 | " | " " | " | " | " | 1 | 50/50 | " | " | " | 4 | 4 | 4 | 5 | 4 | 1.0 | " | |
| 55 | " | " " | " | " | " | 4 | " | " | " | " | 4 | 4 | 5 | 5 | 4 | 1.0 | " | |
| 56 | Com. E | " " | " | " | — | — | 100/0 | — | " | " | 5 | 5 | 5 | 5 | 5 | 10 | X | |
| 57 | " | " " | " | " | 3 | 1 | 90/10 | 30/10 | " | " | 5 | 5 | 5 | 5 | 5 | 5-6 | W | |
| 58 | " | " " | " | " | " | 4 | " | " | " | " | 5 | 5 | 5 | 5 | 5 | " | " | |
| 59 | " | " " | " | " | " | 1 | 40/60 | " | " | " | 3 | 3 | 4 | 4 | 3 | 2-3 | Y | |
| 60 | " | " " | " | " | " | 4 | " | " | " | " | 3 | 3 | 3 | 4 | 3 | " | " | |

TABLE 1-e

| No. | F*1 | G H | I | J*2 | K L*3 | M*4 | Resin Films N | O | P | Q | R | S 0T | 1T | 2T | T | U | V | Remarks |
|---|---|---|---|---|---|---|---|---|---|---|---|---|---|---|---|---|---|---|
| 61 | Com. E | A C.T | 50 | c | 3 | 1 | 20/80 | 30/10 | 1.5 | 150 | 1 | 1 | 2 | 3 | 1 | 6-7 | X | |
| 62 | " | " " | " | " | " | 4 | " | " | " | " | 1 | 1 | 1 | 3 | 1 | " | " | |
| 63 | Inv. E | " " | " | " | " | — | 80/20 | 40/0 | " | 150 | 5 | 5 | 5 | 5 | 5 | 1.5 | W | |
| 64 | " | " " | " | " | " | — | 60/40 | " | " | " | " | 5 | 5 | 5 | 5 | 1.0 | " | |
| 65 | " | " " | " | " | " | — | 50/50 | " | " | " | 4 | 4 | 5 | 5 | 4 | 1.0 | " | |
| 66 | Com. E | " " | " | " | — | — | 100/0 | " | " | " | " | 4 | 4 | 5 | 4 | 10 | X | |
| 67 | " | " " | " | " | 3 | — | 40/60 | " | " | " | 3 | 3 | 3 | 4 | 3 | 4-5 | " | |
| 68 | Inv. E | " " | " | b | " | — | 60/40 | " | " | " | 5 | 5 | 5 | 5 | 5 | 1.5 | W | |
| 69 | " | " " | " | d | " | — | " | " | " | 160 | " | 5 | 5 | 5 | 5 | 0.9 | " | |
| 70 | " | " " | " | e | " | — | " | " | " | " | 4 | 4 | 5 | 5 | 4 | 1.4 | " | |
| 71 | Com. E | " " | " | a | " | — | " | " | " | 150 | 5 | 5 | 5 | 5 | 5 | 7-8 | X | |
| 72 | " | " " | " | f | " | — | " | " | " | 180 | 2 | 2 | 3 | 3 | 3 | 1.0 | W | |
| 73 | " | " " | " | g | " | — | " | " | " | " | 1 | 1 | 1 | 2 | 2 | 0.9 | " | |
| 74 | " | " " | " | h | " | — | " | " | " | 200 | 3 | 2 | 3 | 3 | 2 | 4-5 | " | |
| 75 | " | " " | " | i | " | — | " | " | " | 100 | 2 | 1 | 2 | 2 | 2 | 5-6 | " | |

TABLE 1-f

| No. | F*1 | G H | I | J*2 | K L*3 | M*4 | Resin Films N | O | P | Q | R | S 0T | 1T | 2T | T | U | V | Remarks |
|---|---|---|---|---|---|---|---|---|---|---|---|---|---|---|---|---|---|---|
| 76 | Inv. E | A C.T | 50 | c | 1 | — | 60/40 | 40/0 | 1.5 | 150 | 5 | 5 | 5 | 5 | 5 | 0.9 | W | |
| 77 | " | " " | " | " | 2 | — | " | " | " | " | 5 | 5 | 5 | 5 | 5 | 1.0 | W | |
| 78 | " | " " | " | " | 4 | — | " | " | " | " | 5 | 5 | 5 | 5 | 5 | 1.1 | " | |
| 79 | Com. E | " " | " | " | 5 | — | " | " | " | " | 4 | 4 | 5 | 5 | 4 | 3-4 | " | |
| 80 | " | " " | " | " | Organic composite sili- | | " | " | " | " | 3 | 2 | 3 | 4 | 3 | 2.5 | " | |

TABLE 1-f-continued

| | | Resin Films | | | | | | | | | | Properties after painting 2 coats | | | | | | |
|---|---|---|---|---|---|---|---|---|---|---|---|---|---|---|---|---|---|---|
| | | G | | | K | | | | | | | | S | | | | | |
| No. | F*1 | H | I | J*2 | L*3 | M*4 | N | O | P | Q | R | 0T | 1T | 2T | T | U | V | Remarks |
| 81 | " | B | " | " | cate prepared according | | | " | " | 3 | 2 | 2 | 3 | 3 | 1.9 | " | | |
| 82 | " | C | " | " | to Pat. Pub. 60-33,192 | | | " | " | 2 | 1 | 3 | 3 | 3 | 2.7 | " | | |
| 83 | " | D | " | " | (Silica sol component ratio: 40%; Component ratio of aclyl silicate/ epoxy silicate | | | " | " | 3 | 2 | 3 | 3 | 3 | 1.7 | " | | |

Notes
*1: Refer to Table 2.
*2: Refer to Table 3.
*3: Refer to Table 4.
*4: Refer to Table 5.
Inv. E: Invention Example.
Com. E: Comparativ Example
ET: Electrolytic Type.
C.T: Coating Type.
F: Substrates.
G: Cr Films
H: Kinds.
I: Cr coating amount.
J: Basic Resins,
K: Inorganic Components,
L: Sorts of Silicas,
M: Sorts of Cr Compounds,
N: Weight Ratio of Basic Resin/Silica + Cr compound,
O: Weight Ratio of Silica/Cr Compound.
P: Film coating amount (G/m$^2$).
Q: Baking Temperature (°C.).
R: Scratch Resistance.
S: Bending Test, Adhesion,
T: Adhesion in shock.
U: Corrosion Resistance mm (Peeled Width in one side).
V: Wet Resistance.
W: Good.
X: Appearance of Blister.
Y: Appearance of slight blister,
Z: Slight inferior of weldability

TABLE 2

| | Substrates | |
|---|---|---|
| | Plating Kinds | Plating Amounts |
| A | Galvanized Steel Sheet | 20 g/m$^2$ |
| B | Electric Zn Alloy Plated Sheet (11% Ni—Zn) | 20 g/m$^2$ |
| C | Hot-dip Zn Plated Steel Sheet | 60 g/m$^2$ |
| D | Hot-dip Zn Alloy Plated Sheet | 60 g/m$^2$ |
| E | Cold Rolled Steel Sheet | |

TABLE 3

| | Tg Point (°K.) | Composition | | Remarks |
|---|---|---|---|---|
| | | Resins | Resin/Melamine | |
| a | 283 (10° C.) | Resin I | 9/1 | Outside of the invention |
| b | 298 (25° C.) | Resin I | 8/2 | Within the scope of the invention |
| c | 310 (37° C.) | Resin II | " | Within the scope of the invention |
| d | 328 (55° C.) | Resin III | " | Within the scope of the invention |
| e | 340 (67° C.) | Resin IV | " | Within the scope of the invention |
| f | 360 (87° C.) | Resin V | " | Outside of the invention |
| g | 400 (127° C.) | Resin V | 6/4 | Outside of the invention |
| h | 323 (50° C.) | Resin VI | — | Outside of the invention |
| i | 333 (60° C.) | Resin VII | — | Outside of the invention |

TABLE 4

| No. | Additives |
|---|---|
| 1 | Colloidal silica dispersed in organic solvent (OSCAL 1432 manufactured by Shokubai Kasei) |
| 2 | Colloidal silica dispersed in organic solvent (OSCAL 1622 manufactured by Shokubai Kasei) |
| 3 | Hydrohobic ultrafine silica (R 811 manufactured by Nihon Aerosil) |
| 4 | Hydrohobic ultrafine silica (R 805 manufactured by Nihon Aerosil) |
| 5 | Hydrophilic ultrafine silica (R 200 manufactured by Nihon Aerosil) |

TABLE 5

| No. | Chromate compounds |
|---|---|
| 1 | Strontium chromate (Kikuchi Shikiso Kogyo) |
| 2 | Lead chromate (Kikuchi Shikiso Kogyo) |
| 3 | Zinc chromate (Kikuchi Shikiso Kogyo) |
| 4 | Barium chromate (Kikuchi Shikiso Kogyo) |
| 5 | Calcium chromate (Kikuchi Shikiso Kogyo) |
| 6 | Zinc potassium Chromate (Kikuchi Shikiso Kogyo) |
| 7 | Potassium chromate (Nihon Kagaku Kogyo) |

EXAMPLE 2

For confirming availability of the glass transition temperature of the organic basic resin film, physical properties of the films (water permeability and Tukon hardness) were studied by using the films of a to g of Example 1.

The property measuring tests were made as follows.

TUKON HARDNESS TEST

1) The solutions of the given resins (a to g) were applied on the tin pieces by the barcoater with thickness of about 20 (dried) (the practices had to be done with thicknesses of 0.3 to 5 g/m² within the scope of the invention, but the measurings were difficult with such thicknesses and the properties of the resins were appreciated with the thickness of 20).

2) The baked hardness was formed under the determined baking conditions.

3) Coated tin test pieces were supplied at the temperature of 20° C. to Tukon Hardness Measuring in a thermostat chamber (Tukon Micro Hardness Tester MO by Wilson Instrument Inc.). H₂O Permeability Test 1) The solutions of the given resins (a to g) were applied on the tin pieces by the bar coater with thickness of about 20 (dried) (with the same reason as above).

2) The baked hardness was formed under the determined baking conditions.

3) The paint was peeled from the tin piece by the mercury amalgam method, and a free film was formed.

4) H₂O permeability was measured an ordinary Pain Cut method.

FIG. 1 shows test results, and when the glass transition temperature became below 293° K, the water permeability was high remarkably, and as a result, the corrosion resistance was deteriorated under the wet environment, and on the other hand, the above tempuratuer exceeds 342° K, the hardness of the film increased, so that the adhesion to the surface, i.e., the adhesion with the organic film decreased.

What is claimed is:

1. Multi-layered steel sheets, formed with a chromate film on the surface of a zinc or a zinc alloy plated steel sheet, and a resin composition film at a coating amount of 0.3 to 5.0 g/m² on said chromate film, said resin composition film comprising an organic solvent soluble epoxy resin and hydrophobic silica in a ratio of 80:20 to 50:50 by weight of epoxy resin:hydrophobic silica, said epoxy resin having a glass transition temperature of 293° to 342° K.

2. Multi-layered steel sheets as claimed in claim 1, wherein the Cr coating amount of chromate film is 10 to 200 mg/m² calculated as metallic chromium.

3. Multi-layered steel sheets as claimed in claim 2, wherein the Cr coating amount of chromate film is 30 to 80 mg/m² calculated as metallic chromium.

4. Multi-layered steel sheets as claimed in claim 1, wherein the weight ratio of epoxy resin: hydrophobic silica is 70:30 to 55:45.

5. Multi-layered steel sheets as claimed in claim 1, wherein the grain diameter of hydrophobic silica is 1 to 500 mμ.

6. Multi-layered steel sheets as claimed in claim 5, wherein the grain diameter of the hydrophobic silica is 5 to 100 mμ.

7. Multi-layered steel sheets as claimed in claim 1, wherein the coating amount of the resin composition film is 0.5 to 3.0 g/m².

8. Multi-layered steel sheets as claimed in claim 1, wherein the resin composition film contains silane compound of 0.5 to 15 parts by weigt to 100 parts by weight in total of solid epoxy resin and hydrophobic silica.

9. Multi-layered steel sheets, formed with a chromate film in coating amount of 30 to 80 mg/m² calculated as metallic chromium on the surface of a zinc or a zinc alloy plated steel sheet, and a resin composition film at a coating amount of 0.05 to 3.0 g/m² on said chromate cilm, said resin composition film comprising an organic solvent soluble epoxy resin and hydrophobic silica having a particle size of 5 to 100 mμ in a ratio of 70:30 to 55:45 by weight of epoxy resin:hydrophobic silica, said epoxy resin having a glass transition temperature of 293° to 342° K.

10. Multi-layered steel sheets, formed with a chromate film in coating amount of 30 to 80 mg/m² calculated as metallic chromium on the surface of a zinc or a zinc alloy plated steel sheet, and a resin composition film at a coating amount of 0.05 to 3.0 g/m² on said chromate cilm, said resin composition film, said resin composition film comprising an organic solvent soluble epoxy resin and hydrophobic silica having a particle size of 5 to 100 mμ in a taio of 70:30 to 55:45 by weight of epoxy resin:hydrophobic silica, said epoxy rsin having a glass transition temperature of 293° to 342° K, and 0.5 to 15 weight parts of silane compound per 100 parts by weigth in total of solid epoxy resin and hydrophobic silica.

11. Multi-layered steel sheets, formed with a chromate film in coating amount of 30 to 80 mg/m² calculated as metallic chromium on the surface of a zinc or a zinc alloy plated steel sheet, and a resin composition film at a coating amount of 0.05 to 3.0 g/m² on said chromate cilm, said resin composition film, said resin composition film comprising an organic solvent soluble epoxy resin having glass transition temperature of 293° to 342° K and hydrophobic silica and sparingly water soluble Cr compound in a ratio of 80:20 to 55:45 by weight of epoxy resin:and in a ratio of 37:3 to 20:20 by weight of hydrophobic silica:sparingly water soluble Cr compound.

12. Multi-layered steel sheets as claimed in claim 11, wherein the Cr coating amount of chromate film is 10 to 200 mg/m² calculated as metallic chromium.

13. Multi-layered steel sheets as claimed in claim 12, wherein the Cr coating amount of chromate film is 30 to 80 mg/m² calculated as metallic chromium.

14. Multi-layered steel sheets as claimed in claim 11, wherein the grain diameter of hydrophobic silica is 1 to 500 mμ.

15. Multi-layered steel sheet as claimed in claim 14, wherein the grain diameter of the hydrophobic silica is 5 to 100 mμ.

16. Multi-layered steel sheets as claimed in claim 11, wherein the coating amount of the resin composition film is 0.5 to 3.0 g/m².

17. Multi-layered steel sheets as claimed in claim 11, wherein the weight ratio of basic resin : (hydrophobic silica +sparingly water soluble Cr compcund) is 70:30 to 55:45.

18. Multi-layered steel sheets as claimed in claim 11, wherein the sparingly water soluble Cr compound comprises one or both of $BaCrO_4$ and $SrCrO_4$.

19. Multi-layered steel sheets as claimed in claim 11, wherein the the resin composition film contains silane compound of 0.5 to 15 parts by weight to 100 parts by weight in total of solid epoxy resin and hydrophobic silica.

20. Multi-layered steel sheets, formed with a chromate film in coating amount of 30 to 80 mg/m² calculated as metallic chromium on the surface of a zinc or a zinc alloy plated steel sheet, and a resin composition film at a coating amount of 0.05 to 3.0 g/m² on said chromate cilm, said resin composition film, said resin composition film comprising an organic solvent soluble epoxy resin having glass transition temperature of 293° to 342° K and hydrophobic silica having a particle size of 5 to 100 mμ and sparingly water soluble Cr compound in a ratio of 70:30 to 55:45 by weight of epoxy resin:and in a ratio of 37:3 to 20:20 by weight of hydrophobic silica:sparingly water soluble Cr compound.

21. Multi-layered steel sheets as claimed in claim 20, wherein the sparingly water soluble Cr compound comprises one or both of BaCrO$_4$ and SrCrO$_4$.

22. Multi-layered steel sheets, formed with a chromate film in coating amount of 30 to 80 mg/m$^2$ calculated as metallic chromium on the surface of a zinc or a zinc alloy plated steel sheet, and a resin composition film at a coating amount of 0.05 to 3.0 g/m$^2$ on said chromate cilm, said resin composition film, said resin composition film comprising an organic solvent soluble epoxy resin having glass transition temperature of 293° to 342° K and hydrophobic silica having a particle size of 5 to 100 mμ and sparingly water soluble Cr compound in a ratio of 70:30 to 55:45 by weight of epoxy resin:and in a ratio of 37:3 to 20:20 by weight of hydrophobic silica:sparingly water soluble Cr compound, and 0.05 to 15 parts by weight of silane compound per 100 parts by weight in total of solid epoxy resin and hydrophobic silica.

23. Multi-layered steel sheets as claimed in claim 22, wherein the sparingly water soluble Cr compound comprises one or both of BaCrO$_4$ and SrCrO$_4$.

* * * * *